United States Patent Office 3,545,849
Patented Dec. 8, 1970

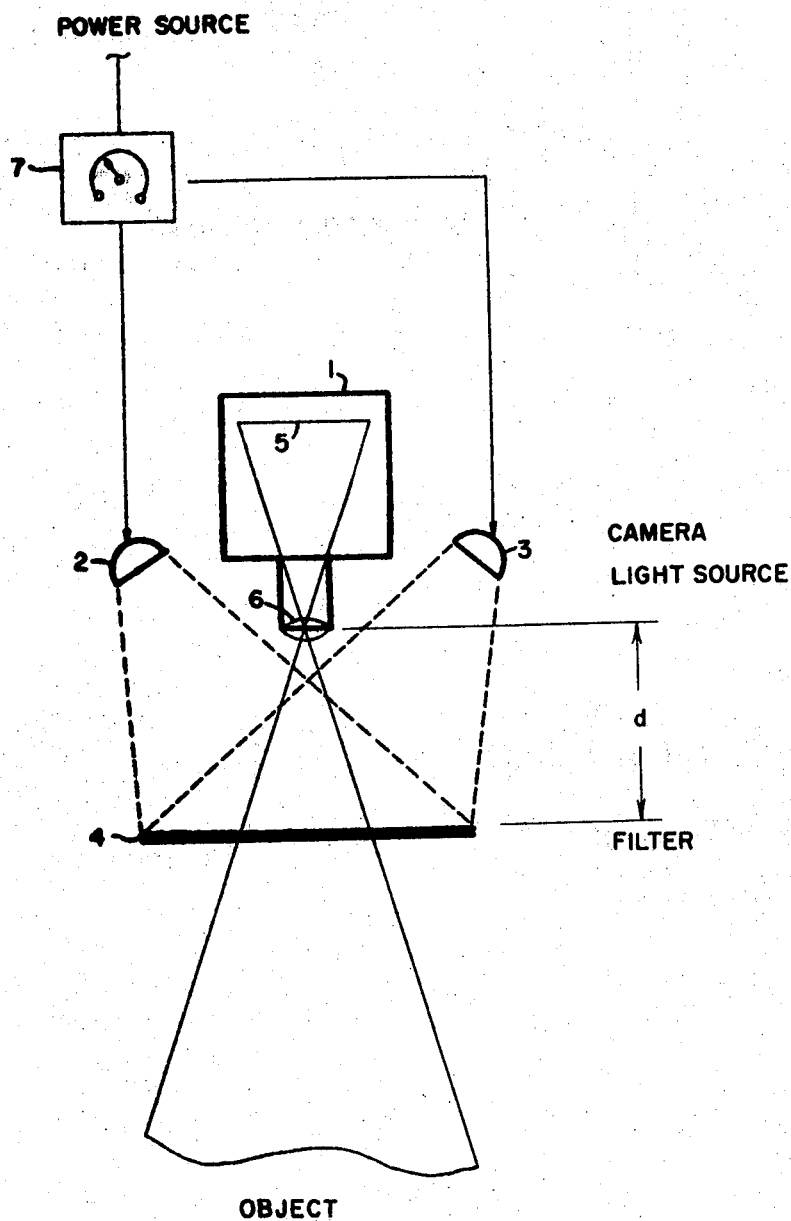

3,545,849
METHOD AND APPARATUS FOR ADDING A DOMINANT COLOR TO AN IMAGE OF AN OBJECT
Aurel Miheles, Bucharest, Rumania, assignor to Comitetul de Stat Pentru Cultura si Arta, Bucharest, Rumania
Filed July 12, 1967, Ser. No. 652,895
Claims priority, application Rumania, July 12, 1966, 51,853
Int. Cl. G03b 15/00
U.S. Cl. 352—45                                  4 Claims

ABSTRACT OF THE DISCLOSURE

Method and apparatus for adding a dominant color to an image of an object. A filter, comprising a net made of cotton or synthetic fiber threads which is painted with the desired dominant color, is arranged between an image-forming camera and the object at a distance from the camera which does not exceed the zone of non-clarity of the camera lens. A supplementary source of light illuminates that side of the filter which faces the camera with an intensity which approximates the amount of light coming from the object. The supplementary source of light is made adjustable in intensity so that the strength of the dominant color may be controlled.

BACKGROUND OF THE INVENTION

The present invention relates to a method for introducing dominant colors on the images of color cinema to obtain pictorial impression in a certain dominant color; to the appearance and disappearance of this dominant color; as well as to a filter and apparatus to carry out this method.

Several different methods are known for introducing one or more dominant colors to the colored image in a cinematic, a photographic, or a TV camera. These include Celluloid filters or another transparent support and painting the scenery. The methods using colored filters placed in front of the camera don't give full satisfaction as the color of all objects in their influence zone is modified. In the case of colored filters applied to the light sources, only the illuminated surfaces will get their color.

The method of transforming the natural scenery by painting has the disadvantage of being expensive, difficult to realize, and of being permanently exposed to damage by atmospheric agents. For each color wished, a repainting is necessary.

SUMMARY OF THE INVENTION

This invention does away with the disadvantages of the known methods by using a filter placed with an exposure window in front of the camera at a distance which should not exceed the zone of nonclarity of the lens used. The filter gets a supplementary quantity of light, sufficient for a normal exposure, from the side opposite the rays coming from the object, the intensity of this illumination being very close or equal to the exposure light of the object shot. The filter consists of a net of cotton threads, or synthetic fibers, upon which a layer of paint (tempera) is applied corresponding to the dominant color wanted and helps achieve an effect of appearance and disappearance of the dominant color inside the same picture gate by varying the intensity of the luminous flux of the supplementary source.

The "zone of non-clarity" as used above and hereinafter in the disclosure of the present invention is intended to describe that area in the field of vision of a camera between the camera lens and the closest plane in the depth of field.

In practice, when an object is viewed through the filter, the filter net is out of focus and, therefore, partially transparent. The intensity of the dominant color may be increased and decreased by varying the intensity of illumination produced by the supplementary source of light.

BRIEF DESCRIPTION OF THE DRAWING

The sole figure is a representational diagram of the method and apparatus used to add dominant color to object images according to the preferred embodiments of the present invention.

The filter 4 is manufactured out of a net texture of thin cotton threads fixed upon a wooden or metallic picture gate and has following characteristics:

The total transparence of the non-colored filter 4 is about 75–80%. The filter 4 is painted with water colors, preferably tempera, the color layer corresponding to the dominant color. After drying, other colors can be applied successively, as necessary for obtaining the pictorial effect wanted. The dominant color may occupy, as needed, about 60–80% of the total surface of the filter. The filter 4 prepared in this way has a total transparence of about 65–70% and is fixed upon a support (not shown) in front of the camera 1 at at distance $d$ not exceeding the zone of non-clarity of the lens 6.

For transporting the colors from the texture to (e.g.,) the film 5, is is necessary that the filter 4 receive a quantity of illumination sufficient for a normal exposure, i.e. near or equal to the exposure light of the object shot. This is achieved by light sources 2, 3, for example, projectors, illuminating the filter 4 on the side facing camera 1. The appearance and disappearance of the dominant color is obtained by connecting the supplementary light sources 2, 3 to a power source by means of rheostat 7. Turning the button of the rheostat from zero to the maximum point, corresponding to the necessary light for a normal exposure, the color from the filter will appear upon the film. Proceeding inversely, the color will disappear.

It has now been established that when the filter 4 is placed in the zone of non-clarity and is not supplementarily illuminated, the colors of the object will be registered unmodified on the film. This is due to the fact that in this zone of non-clarity, the threads of the filter lose their material style and become only a light scattering means.

When the filter is illuminated, the color applied to it will reflect the light in a scattered form, and be superimposed upon the color of the photographed object, producing in this way the dominant color wanted on the film. Varying the intensity of the illumination of the filter varies the intensity of the scattered reflected light. The effect is a variation in the intensity, i.e. appearance and disappearance, of the dominant color.

Compared with the known methods, this invention has the following advantages:

It allows simultaneous use of a number of different dominant colors or color spots for achieving a pictorial effect;

It makes it possible to control the intensity and position of the dominant color. The color or colors may be made to appear and disappear or to move within the picture frame for dramatic effect of the dominant color;

It may be used to obtain a spreading effect of the color in space;

It makes it possible to change the color or hues without stopping the camera;

It ensures the unity of color for inside and outside scenes by using the same filter;

The method can be used for both color photography and color television.

It will be understood that the above description of the present invention is susceptible to various modifications, changes and adaptations.

What I claim is:

1. A method for adding a dominant color to an image of an object comprising the steps of:
  (a) arranging a colored filter between a motion picture camera and an object to be photographed, arranging said filter at a distance from said lens which does not exceed the zone of non-clarity of said lens;
  (b) illuminating the object to be photographed;
  (c) illuminating said filter on the side facing said camera so that said filter will reflect the incident light in a scattered form; and
  (d) selectively increasing and decreasing the intensity of the illumination of the filter between zero and a value substantially equal to the intensity of illumination of the object to be photographed during filming of a motion picture, so that the intensity of the dominant color is correspondingly changed.

2. Apparatus for adding a dominant color to an image of an object being illuminated at a predetermined intensity comprising, in combination:
  (a) means for forming an image, said means having a lens;
  (b) filter means including a net and a color layer on said net of at least one color corresponding to said dominant color and arranged in front of said image-forming means within the zone of non-clarity of said lens;
  (c) light means for illuminating said filter on the side of said filter which faces said means having a lens, so that the color layer of said filter will reflect the incident light in a scattered form; and
  (d) control means, connected to said light means, for selectively increasing and decreasing the intensity of illumination of said filter from zero to a value substantially equal to the intensity of illumination of the object to be photographed.

3. The apparatus defined in claim 2 wherein said net is comprised of cotton threads.

4. The apparatus defined in claim 2 wherein said net is comprised of synthetic fiber threads.

References Cited

UNITED STATES PATENTS

| | | | |
|---|---|---|---|
| 1,504,328 | 8/1924 | Douglass | 352—47 |
| 2,148,508 | 2/1939 | Seitz | 352—85 |
| 3,085,799 | 4/1963 | Alswang | 352—28X |
| 1,742,680 | 1/1930 | Artigue | 352—49 |
| 2,281,033 | 4/1942 | Garity | 352—49 |

JOHN M. HORAN, Primary Examiner

M. H. HAYES, Assistant Examiner

U.S. Cl. X.R.

95—12.2; 350—124; 352—49, 85; 353—29, 84